(12) United States Patent
Wu

(10) Patent No.: US 8,084,111 B2
(45) Date of Patent: Dec. 27, 2011

(54) POLYANILINE DIALKYLSULFATE COMPLEXES CONTAINING INTERMEDIATE TRANSFER MEMBERS

(75) Inventor: Jin Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 431 days.

(21) Appl. No.: 12/413,832

(22) Filed: Mar. 30, 2009

(65) Prior Publication Data

US 2010/0248104 A1 Sep. 30, 2010

(51) Int. Cl.
- B32B 1/08 (2006.01)
- B32B 27/18 (2006.01)
- B32B 27/34 (2006.01)
- B32B 27/36 (2006.01)
- G03G 15/16 (2006.01)

(52) U.S. Cl. .................. 428/36.91; 428/327; 428/411.1; 428/412; 428/421; 428/422; 428/473.5; 428/474.4; 428/480; 399/308

(58) Field of Classification Search .......................... None
See application file for complete search history.

(56) References Cited

U.S. PATENT DOCUMENTS

| | | | |
|---|---|---|---|
| 4,806,271 A | 2/1989 | Yaniger et al. | |
| 5,298,956 A * | 3/1994 | Mammino et al. | 399/308 |
| 5,487,707 A | 1/1996 | Sharf et al. | |
| 6,318,223 B1 | 11/2001 | Yu et al. | |
| 6,397,034 B1 | 5/2002 | Tarnawskyj et al. | |
| 6,440,515 B1 | 8/2002 | Thornton et al. | |
| 6,489,020 B1 * | 12/2002 | Caruthers et al. | 428/327 |
| 6,602,156 B2 | 8/2003 | Schlueter, Jr. | |
| 7,031,647 B2 | 4/2006 | Mishra et al. | |
| 7,130,569 B2 | 10/2006 | Goodman et al. | |
| 7,139,519 B2 | 11/2006 | Darcy, III et al. | |
| 7,910,183 B2 | 3/2011 | Wu | |
| 2003/0037859 A1 * | 2/2003 | Thornton et al. | 156/154 |
| 2005/0145832 A1 * | 7/2005 | Wessling et al. | 252/500 |
| 2006/0002747 A1 * | 1/2006 | Goodman et al. | 399/302 |
| 2010/0247918 A1 | 9/2010 | Wu | |
| 2010/0247919 A1 | 9/2010 | Wu | |
| 2010/0248102 A1 | 9/2010 | Wu | |
| 2010/0248103 A1 | 9/2010 | Wu | |
| 2010/0248106 A1 | 9/2010 | Wu | |
| 2010/0248107 A1 | 9/2010 | Wu et al. | |
| 2010/0248108 A1 | 9/2010 | Wu et al. | |
| 2010/0249322 A1 | 9/2010 | Wu | |

OTHER PUBLICATIONS

Jin Wu, U.S. Appl. No. 12/360,190 on Polyaniline Viologen Charge Transfer Complexes Containing Intermediate Transfer Members, filed Jan. 27, 2009.
Jin Wu, U.S. Appl. No. 12/360,307 on Polypyrrole Containing Intermediate Transfer Components, filed Jan. 27, 2009.
Jin Wu, U.S. Appl. No. 12/360,324 on Nano Diamond Containing Intermediate Transfer Members, filed Jan. 27, 2009.
Jin Wu, U.S. Appl. No. 12/200,074 entitled Hydrophobic Carbon Black Intermediate Transfer Components, filed Aug. 28, 2008.
Jin Wu, U.S. Appl. No. 12/200,111 entitled Hydrophobic Polyetherimide/Polysiloxane Copolymer Intermediate Transfer Components, filed Aug. 28, 2008.
Jin Wu et al., U.S. Appl. No. 12/200,147 entitled Coated Seamed Transfer Member, filed Aug. 28, 2008.
Jin Wu et al., U.S. Appl. No. 12/200,179 entitled Coated Transfer Member, filed Aug. 28, 2008.
Jin Wu, U.S. Appl. No. 12/129,995 on Polyimide Intermediate Transfer Components, filed May 30, 2008.
Jin Wu, U.S. Appl. No. 12/181,354, on Core Shell Intermediate Transfer Components, filed Jul. 29, 2008.
Jin Wu, U.S. Appl. No. 12/181,409 on Treated Carbon Black Intermediate Transfer Components, filed Jul. 29, 2008.

* cited by examiner

Primary Examiner — Ramsey Zacharia
(74) Attorney, Agent, or Firm — Oliff & Berridge, PLC

(57) ABSTRACT

An intermediate transfer media, such as a belt, that includes a polyaniline dialkylsulfate complex.

24 Claims, No Drawings

POLYANILINE DIALKYLSULFATE COMPLEXES CONTAINING INTERMEDIATE TRANSFER MEMBERS

CROSS REFERENCE TO RELATED APPLICATIONS

Copending U.S. application Ser. No. 12/413,627, U.S. Publication No. 20100248103, filed Mar. 30, 2009, entitled Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a glycoluril resin, and a polyol resin mixture.

Copending U.S. application Ser. No. 12/413,633, U.S. Publication No. 20100249322, filed Mar. 30, 2009, entitled Fluorinated Sulfonic Acid Polymer Grafted Polyaniline Containing Intermediate Transfer Members, the disclosure of which is totally incorporated herein by reference, illustrates an intermediate transfer member comprised of a substrate, and in contact therewith a polyaniline having grafted thereto a fluorinated sulfonic acid polymer.

Copending U.S. application Ser. No. 12/413,638, U.S. Publication No. 20100247918, filed Mar. 30, 2009, entitled Perfluoropolyether Polymer Grafted Polyaniline Containing Intermediate Transfer Members, the disclosure of which is totally incorporated herein by reference, illustrates an intermediate transfer member comprised of a substrate and in contact with the substrate a polyaniline grafted perfluoropolyether phosphoric acid polymer.

Copending U.S. application Ser. No. 12/413,642, U.S. Publication No. 20100247919, filed Mar. 30, 2009 , entitled Fluorotelomer Grafted Polyaniline Containing Intermediate Transfer Members, the disclosure of which is totally incorporated herein by reference, illustrates An intermediate transfer member comprised of a substrate, and a layer comprised of polyaniline having grafted thereto a fluorotelomer.

U.S. application Ser. No. 12/413,645, now U.S. Pat. No. 7,910,183, filed Mar. 30, 2009, entitled Layered Intermediate Transfer Members, the disclosure of which is totally incorporated herein by reference, illustrates an intermediate transfer member comprised of a polyimide substrate, and thereover a polyetherimide/polysiloxane.

Copending U.S. application Ser. No. 12/413,651, U.S. Publication No. 20100248106, filed Mar. 30, 2009, entitled Polyimide Polysiloxane Intermediate Transfer Members, the disclosure of which is totally incorporated herein by reference, illustrates an intermediate transfer member comprised of at least one of a polyimide/polyetherimide/polysiloxane, and a polyimide polysiloxane.

Copending U.S. application Ser. No. 12/413,783, U.S. Publication No. 20100248107, filed Mar. 30, 2009, entitled Glycoluril Resin And Polyol Resin Members, the disclosure of which is totally incorporated herein by reference, illustrates a process which comprises providing a flexible belt having at least one welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a resin mixture of a glycoluril resin and a polyol resin.

Copending U.S. application Ser. No. 12/413,795, U.S. Publication No. 20100248108, filed Mar. 30, 2009, entitled Glycoluril Resin And Polyol Resin Dual Members, the disclosure of which is totally incorporated herein by reference, illustrates a process which comprises providing a flexible belt having at least one welded seam extending from one parallel edge to the other parallel edge of the coating, the welded seam having a rough seam region comprising an overlap of two opposite edges; contacting the rough seam region with a heat and pressure applying tool; and smoothing out the rough seam region with heat and pressure applied by the heat and pressure applying tool, and subsequently coating the belt with a resin mixture of a glycoluril resin and a polyol resin.

Copending U.S. application Ser. No. 12/413,852, U.S. Publication No. 20100248102, filed Mar. 30, 2009, entitled Crosslinked Resin Mixture Backing Layer Containing Photoconductor, the disclosure of which is totally incorporated herein by reference, illustrates a photoconductor comprising a substrate, an imaging layer thereon, and a backing layer located on a side of the substrate opposite the imaging layer wherein the outermost layer of the backing layer adjacent to the substrate is comprised of a mixture of glycoluril resin and a polyacetal resin mixture.

Illustrated in U.S. application Ser. No. 12/360,190, U.S. Publication No. 20100190956, entitled Polyaniline Viologen Charge Transfer Complexes Containing Intermediate Transfer Members, filed Jan. 27, 2009, the disclosure of which is totally incorporated herein by reference, is an intermediate transfer member comprised of a substrate and a polyaniline viologen charge transfer complex.

Copending U.S. application Ser. No. 12/360,307, U.S. Publication No. 20100190008, on Polypyrrole Containing Intermediate Transfer Components, filed Jan. 27, 2009, the disclosure of which is totally incorporated herein by reference, illustrates an intermediate transfer member comprised of a substrate comprising a carbon black which is surface treated with a polypyrrole.

Copending U.S. application Ser. No. 12/360324, U.S. Publication 20100190007, on Nano Diamond Containing Intermediate Transfer Members, filed Jan. 27, 2009, the disclosure of which is totally incorporated herein by reference, illustrates an intermediate transfer member comprised of a nano diamond.

Illustrated in U.S. application Ser. No. 12/200,074, U.S. Publication No. 20100055463, entitled Hydrophobic Carbon Black Intermediate Transfer Components, filed Aug. 28, 2008, the disclosure of which is totally incorporated herein by reference, is an intermediate transfer member comprised of a substrate comprising a carbon black surface treated with a poly(fluoroalkyl acrylate).

Illustrated in U.S. application Ser. No. 12/200,111, U.S. Publication No. 20100055445, entitled Hydrophobic Polyetherimide/Polysiloxane Copolymer Intermediate Transfer Components, filed Aug. 28, 2008, is an intermediate transfer member comprised of a substrate comprising a polyetherimide polysiloxane copolymer.

Illustrated in U.S. application Ser. No. 12/200,147 entitled Coated Seamed Transfer Member, filed Aug. 28, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the seam with a crosslinked acrylic resin.

Illustrated in U.S. application Ser. No. 12/1200,179, U.S. Publication No. 20100051171, entitled Coated Transfer Member, filed Aug. 28, 2008, is a process which comprises providing a flexible belt having a welded seam extending from one parallel edge to the other parallel edge, the welded seam having a rough seam region comprising an overlap of two opposite edges; contacting the rough seam region with a heat and pressure applying tool; and smoothing out the rough seam region with heat and pressure applied by the heat and pressure applying tool to produce a flexible belt having a smooth welded seam, and subsequently coating the belt with a crosslinked acrylic resin.

Illustrated in U.S. application Ser. No. 12/129,995, now U.S. Pat. No. 8,005,410, filed May 30, 2008, entitled Polyimide Intermediate Transfer Components, the disclosure of which is totally incorporated herein by reference, is an intermediate transfer belt comprised of a substrate comprising a polyimide and a conductive component wherein the polyimide is cured at a temperature of from about 175° C. to about 290° C. over a period of time of from about 10 minutes to about 120 minutes.

Illustrated in U.S. application Ser. No. 12/181,354, now U.S. Pat. 7,985,464, filed Jul. 29, 2008, entitled Core Shell Intermediate Transfer Components, the disclosure of which is totally incorporated herein by reference, is an intermediate transfer belt comprised of a substrate comprising a conductive core shell component.

Illustrated in U.S. application Ser. No. 12/181,409, now U.S. Pat. 7,738,824, filed Jul. 29, 2008, entitled Treated Carbon Black Intermediate Transfer Components, the disclosure of which is totally incorporated herein by reference, is an intermediate transfer members comprised of a substrate comprising a poly(vinylalkoxysilane) surface treated carbon black.

BACKGROUND

Disclosed are intermediate transfer members, and more specifically, intermediate transfer members useful in transferring a developed image in an electrostatographic, for example xerographic, including digital, image on image, and the like, machines or apparatuses and printers. In embodiments, there are selected intermediate transfer members comprised of a polyaniline/dialkylsulfate complex, such as a polyaniline/dimethylsulfate, and which enables members such as intermediate transfer belts to possess excellent resistivity characteristics, and more specifically, wherein the surface resistivity of the member is stable and constant, or where minimal increase in surface resistivity results. In embodiments thereof, the polyaniline dialkylsulfate complexes are dispersed in or mixed with a suitable polymer, such as a polycarbonate. Also, disclosed herein are processes for the preparation of the polyaniline dialkylsulfate complexes.

A number of advantages are associated with the intermediate transfer members, such as belts (ITB) of the present disclosure, such as an excellent maintained conductivity for extended time periods; dimensional stability; ITB humidity insensitivity for extended time periods; excellent dispersability in a polymeric solution; and low and acceptable surface friction characteristics.

In a typical electrostatographic reproducing apparatus, a light image of an original to be copied is recorded in the form of an electrostatic latent image upon a photosensitive member, and the latent image is subsequently rendered visible by the application of electroscopic thermoplastic resin particles and colorant. Generally, the electrostatic latent image is developed by contacting it with a developer mixture comprised of a dry developer mixture, which usually comprises carrier granules having toner particles adhering triboelectrically thereto, or a liquid developer material, which may include a liquid carrier having toner particles dispersed therein. The developer material is advanced into contact with the electrostatic latent image, and the toner particles are deposited thereon in image configuration. Subsequently, the developed image is transferred to a copy sheet. It is advantageous to transfer the developed image to a coated intermediate transfer web, belt or component, and subsequently transfer with a high transfer efficiency the developed image from the intermediate transfer member to a permanent substrate. The toner image is subsequently usually fixed or fused upon a support, which may be the photosensitive member itself, or other support sheet such as plain paper.

In electrostatographic printing machines wherein the toner image is electrostatically transferred by a potential difference between the imaging member and the intermediate transfer member, the transfer of the toner particles to the intermediate transfer member and the retention thereof should be substantially complete so that the image ultimately transferred to the image receiving substrate will have a high resolution. Substantially about 100 percent toner transfer occurs when most or all of the toner particles comprising the image are transferred, and little residual toner remains on the surface from which the image was transferred.

Intermediate transfer members possess a number of advantages, such as enabling high throughput at modest process speeds; improving registration of the final color toner image in color systems using synchronous development of one or more component colors and using one or more transfer stations; and increasing the number of substrates that can be selected. However, a disadvantage of using an intermediate transfer member is that a plurality of transfer operations is usually needed allowing for the possibility of charge exchange occurring between toner particles and the transfer member which ultimately can lead to less than complete toner transfer, resulting in low resolution images on the image receiving substrate, and image deterioration. When the image is in color, the image can additionally suffer from color shifting and color deterioration.

Attempts at controlling the resistivity of intermediate transfer members by, for example, adding conductive fillers, such as ionic additives and/or carbon black to the outer layer, are disclosed in U.S. Pat. No. 6,397,034 which describes the use of fluorinated carbon filler in a polyimide intermediate transfer member layer. However, there can be problems associated with the use of such fillers in that undissolved particles frequently bloom or migrate to the surface of the fluorinated polymer and cause imperfections to the polymer, thereby causing nonuniform resistivity, which in turn causes poor antistatic properties and poor mechanical strength characteristics. Also, ionic additives on the ITB surface may interfere with toner release. Furthermore, bubbles may appear in the polymer, some of which can only be seen with the aid of a microscope, and others of which are large enough to be observed with the naked eye resulting in poor or nonuniform electrical properties and poor mechanical properties.

In addition, the ionic additives themselves are sensitive to changes in temperature, humidity, and operating time. These sensitivities often limit the resistivity range. For example, the resistivity usually decreases by up to two orders of magnitude or more as the humidity increases from about 20 percent to 80 percent relative humidity. This effect limits the operational or process latitude.

Moreover, ion transfer can also occur in these systems. The transfer of ions leads to charge exchanges and insufficient transfers, which in turn causes low image resolution and image deterioration, thereby adversely affecting the copy quality. In color systems, additional adverse results include color shifting and color deterioration. Ion transfer also increases the resistivity of the polymer member after repetitive use. This can limit the process and operational latitude, and eventually the ion filled polymer member will be unusable.

Therefore, it is desired to provide an intermediate transfer member, which has excellent transfer capabilities; is conductive, and more specifically has improved conductivity as compared, for example, to an intermediate transfer member where the polyaniline dialkylsulfate complex is absent; possesses excellent humidity insensitivity characteristics leading to high copy quality where developed images with minimal resolution issues can obtained. It is also desired to provide a weldable intermediate transfer belt that may not, but could, have puzzle cut seams, and instead, has a weldable seam, thereby providing a belt that can be manufactured without labor intensive steps, such as manually piecing together the puzzle cut seam with fingers, and without the lengthy high temperature and high humidity conditioning steps.

A number of the known ITB formulations apply carbon black (CB) or polyaniline (PANI) as the conductive species; however, this has some limitations. For example, polyaniline is readily oxidized and results in loss of conductivity, its thermal stability is usually limited to about 200° C., and it begins to lose its conductivity at above 200° C. Also, It can be difficult to prepare carbon black based ITBs with consistent resistivity because the required loadings reside on the vertical part of the percolation curve. The amount of carbon black and how carbon black is processed (primary particle size and aggregate size) are of value for conductivity, and for the manufacturing of intermediate belts.

REFERENCES

Illustrated in U.S. Pat. No. 7,031,647 is an imageable seamed belt containing a lignin sulfonic acid doped polyaniline.

Illustrated in U.S. Pat. No. 7,139,519 is an intermediate transfer belt, comprising a belt substrate comprising primarily at least one polyimide polymer; and a welded seam.

Illustrated in U.S. Pat. No. 7,130,569 is a weldable intermediate transfer belt comprising a substrate comprising a homogeneous composition comprising a polyaniline in an amount of, for example, from about 2 to about 25 percent by weight of total solids, and a thermoplastic polyimide present in an amount of from about 75 to about 98 percent by weight of total solids, wherein the polyaniline has a particle size of, for example, from about 0.5 to about 5 microns.

Puzzle cut seam members are disclosed in U.S. Pat. Nos. 5,487,707; 6,318,223, and 6,440,515.

Illustrated in U.S. Pat. No. 6,602,156 is a polyaniline filled polyimide puzzle cut seamed belt, however, the manufacture of a puzzle cut seamed belt is labor intensive and costly, and the puzzle cut seam, in embodiments, is sometimes weak. The manufacturing process for a puzzle cut seamed belt usually involves a lengthy in time high temperature and high humidity conditioning step. For the conditioning step, each individual belt is rough cut, rolled up, and placed in a conditioning chamber that is environmentally controlled at about 45° C. and about 85 percent relative humidity, for approximately 20 hours. To prevent or minimize condensation and watermarks, the puzzle cut seamed transfer belt resulting is permitted to remain in the conditioning chamber for a suitable period of time, such as 3 hours. The conditioning of the transfer belt renders it difficult to automate the manufacturing thereof, and the absence of such conditioning may adversely impact the belts electrical properties, which in turn results in poor image quality.

Disclosed in U.S. Pat. No. 4,806,271 are complexes of a polyaniline and a dialkylsulfate, and which complexes can be selected for the intermediate transfer member of the present disclosure.

SUMMARY

In embodiments, there is disclosed an intermediate transfer member comprised of a substrate comprising a polyaniline dialkylsulfate complex; a transfer media comprised of a conductive polyaniline dialkylsulfate complex; an intermediate transfer member, such as an intermediate belt comprised of a substrate comprising a polyaniline dialkylsulfate complex; an intermediate transfer member wherein the resistivity thereof is from about $10^6$ to about $10^{13}$ ohm/sq, from about $10^8$ to about $10^{12}$ ohm/sq, and more specifically from about $10^9$ to about $10^{11}$ ohm/sq.

In embodiments, there is disclosed an intermediate transfer member comprised of a substrate comprising a polyaniline dialkylsulfate complex with an excellent maintained resistivity for extended time periods. More specifically, there is almost no change or in embodiments about only a 40 percent change, in the intermediate transfer member surface resistivity with, for example, an intermediate transfer member comprised of a substrate comprising a polyaniline dialkylsulfate complex, and where when it is aged in J zone (75° F./10 percent humidity) for two months, in comparison and under the same conditions, to an about 1,400 percent increase in surface resistivity for an intermediate transfer member comprised of a substrate comprising a polyaniline.

In addition, the present disclosure provides, in embodiments, an apparatus for forming images on a recording medium comprising a charge retentive surface to receive an electrostatic latent image thereon; a development component to apply toner to the charge retentive surface to develop the electrostatic latent image and to form a developed image on the charge retentive surface; a weldable intermediate transfer belt to transfer the developed image from the charge retentive surface to a substrate, and a fixing component.

DETAILED DESCRIPTION

Aspects of the present disclosure relate to an intermediate transfer member comprised of a polyaniline dialkylsulfate complex; an intermediate transfer belt comprised of a supporting substrate, and in contact with the substrate a layer comprised of a polyaniline dialkylsulfate complex; and a transfer media, such as an intermediate transfer belt, comprised of a polyaniline dimethylsulfate complex component.

Examples of the polyaniline dialkylsulfate complex selected for the intermediate transfer members of the present disclosure are a polyaniline dimethylsulfate complex; polyaniline diethylsulfate complex; a polyaniline dipropylsulfate complex; a polyaniline dibutylsulfate complex; a polyaniline dipentylsulfate complex; a polyaniline dihexylsulfate complex; a polyaniline diheptylsulfate complex; and the like. For the dialkylsulfate, alkyl contains, for example, from 1 to about 25, from 1 to about 18, from 1 to about 10, and from 1 to about 5 carbon atoms. Additionally, aryl or diaryl sulfate complexes can be selected, it is believed, for the intermediate transfer members disclosed herein.

In embodiments, a process for the preparation of the polyaniline dialkylsulfate complex can be illustrated with reference to the following reaction scheme

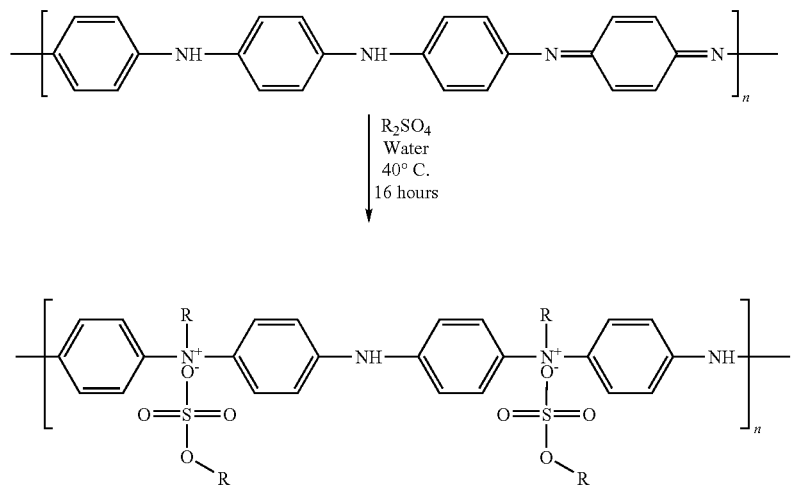

wherein n is the degree of polymerization of from about 30 to about 300, or from about 50 to about 100; and R is alkyl having from about 1 to about 18 carbon atoms.

More specifically, when a hydrochloride acid doped polyaniline emeraldine base (EB) (1 part) is mixed with a dimethylsulfate (0.1 part) in water (6 parts) at a temperature of from about 20° C. to about 80° C., from about 30° C. to about 50° C., or 40° C. for a period of from about 1 to about 48 hours, from about 4 to about 30 hours, or 16 hours, an oxidative doping reaction occurs, and a polyaniline dimethylsulfate complex is formed. With proper purification procedures, the newly formed complex is isolated from the mixture, and selected for intermediate transfer members with the excellent maintained resistivity.

Examples of the polyaniline component forming the complex with the dialkylsulfate is, for example, comprised of relatively small particles with size diameter of, for example, from about 0.5 to about 5 microns, from about 1.1 to about 2.3 microns, from about 1.2 to about 2 microns, from about 1.5 to about 1.9 microns, or about 1.7 microns. Specific examples of polyanilines selected for the transfer member, such as an ITB, are PANIPOL™ F, commercially available from Panipol Oy, Finland.

The weight ratio of the polyaniline and the dialkylsulfate in the polyaniline dialkylsulfate complex is, for example, from about 30/70 to about 99/1, or from about 60/40 to about 90/10; and the complex is present in an amount of, for example, from about 3 to about 30, or from about 5 to about 20 weight percent of the intermediate transfer member components.

Examples of additional components present in the intermediate transfer member are a number of known polymers and conductive components.

Examples of the polymeric binders selected to disperse the complex are polyimides (thermosetting or thermoplastic), polycarbonate, polyesters such as poly(ethylene terephthalate) (PET), poly(ethylene naphthalate) (PEN), poly(butylene terephthalate) (PBT), polyvinylidene fluoride (PVDF), polyethylene-co-polytetrafluoroethylene, polyamidimide, polyphenylene sulfide, polyamide, polysulfone, polyetherimide, polyester copolymer, and rapidly cured polyimide polymers such as VTEC™ PI 1388, 080-051, 851, 302, 203, 201 and PETI-5, all available from Richard Blaine International, Incorporated, Reading, Pa. The thermosetting polyimides are cured at suitable temperatures, and more specifically, from about 180° C. to about 260° C. over a short period of time, such as, for example, from about 10 to about 120 minutes, and from about 20 to about 60 minutes; possess, for example, a number average molecular weight of from about 5,000 to about 500,000, or from about 10,000 to about 100,000, and a weight average molecular weight of from about 50,000 to about 5,000,000, or from about 100,000 to about 1,000,000; thermosetting polyimide precursors that are cured at higher temperatures (above 300° C.) than the VTEC™ PI polyimide precursors, and which precursors include, for example, PYRE-M.L® RC-5019. RC-5057, RC-5069, RC-5097, RC-5053 and RK-692, all commercially available from Industrial Summit Technology Corporation, Parlin, N.J.; RP-46 and RP-50, both commercially available from Unitech LLC, Hampton, Va.; DURIMIDE® 100 commercially available from FUJIFILM Electronic Materials U.S.A., Inc., North Kingstown, R.I.; and KAPTON® HN, VN, and FN, commercially available from E.I. DuPont, Wilmington, Del., in amounts of, for example, of from about 70 to about 97, or from about 80 to about 95 weight percent of the intermediate transfer member.

Examples of specific selected thermoplastic polyimides are KAPTON® KJ, commercially available from E.I. DuPont, Wilmington, Del., as represented by

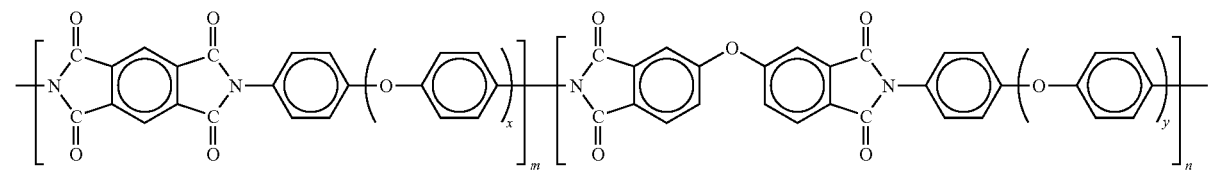

wherein x is equal to 2; y is equal to 2; m and n are from about 10 to about 300; and IMIDEX®, commercially available from West Lake Plastic Company, as represented by

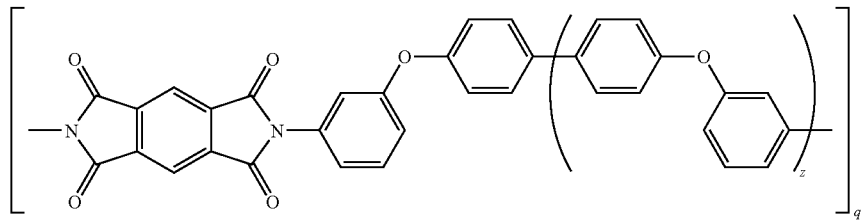

wherein z is equal to 1, and q is from about 10 to about 300.

Examples of polycarbonate binders selected include poly (4,4'-isopropylidene-diphenylene)carbonate (also referred to as bisphenol-A-polycarbonate), poly(4,4'-cyclohexylidine diphenylene)carbonate (also referred to as bisphenol-Z-polycarbonate), poly(4,4'-isopropylidene-3,3'-dimethyl-diphenyl)carbonate (also referred to as bisphenol-C-polycarbonate), and the like. In embodiments, the intermediate transfer member binders are comprised of bisphenol-A-polycarbonate resins, commercially available as MAKROLON®, with a weight average molecular weight of from about 50,000 to about 500,000.

Examples of additional components present in the intermediate transfer member are a number of known conductive components present in an amount of from about 3 to about 20 weight percent such as a second polyaniline, carbon black or metal oxide. In embodiments, the second polyaniline component has a relatively small particle size of, for example, from about 0.5 to about 5 microns, from about 1.1 to about 2.3 microns, from about 1.2 to about 2 microns, from about 1.5 to about 1.9 microns, or about 1.7 microns.

Specific examples of polyanilines selected for the transfer member, such as an ITB, are PANIPOL™ F, commercially available from Panipol Oy, Finland; and lignosulfonic acid grafted polyanilines.

Examples of carbon black included in the intermediate transfer member are VULCAN® carbon blacks, REGAL® carbon blacks, and BLACK PEARLS® carbon blacks available from Cabot Corporation. Specific examples of conductive carbon blacks are BLACK PEARLS® 1000 (B.E.T. surface area=343 $m^2/g$, DBP absorption=105 ml/g), BLACK PEARLS® 880 (B.E.T. surface area=240 $m^2/g$, DBP absorption=106 ml/g), BLACK PEARLS® 800 (B.E.T. surface area=230 $m^2/g$, DBP absorption=68 ml/g), BLACK PEARLS® L (B.E.T. surface area=138 $m^2/g$, DBP absorption=61 ml/g), BLACK PEARLS® 570 (B.E.T. surface area=110 $m^2/g$, DBP absorption=114 ml/g), BLACK PEARLS® 170 (B.E.T. surface area=35 $m^2/g$, DBP absorption=122 ml/g), VULCAN® XC72 (B.E.T. surface area=254 $m^2/g$, DBP absorption=176 ml/g), VULCAN® XC72R (fluffy form of VULCAN® XC72), VULCAN® XC605, VULCAN® XC305, REGAL® 660 (B.E.T. surface area=112 $m^2/g$, DBP absorption=59 ml/g), REGAL® 400 (B.E.T. surface area=96 $m^2/g$, DBP absorption=69 ml/g), and REGAL® 330 (B.E.T. surface area=94 $m^2/g$, DBP absorption=71 ml/g). Dibutyl phthalate (DBP) absorption by the voids within carbon blacks are used to measure the structure of carbon black. The higher the structure, the more the voids, and the higher is the DBP absorption.

Examples of metal oxide include tin oxide, antimony doped tin oxide, indium oxide, indium tin oxide, zinc oxide, and titanium oxide.

For example, the polyaniline dialkylsulfate complex can be dispersed in a fast cure thermosetting polyimide/N-methyl-2-pyrrolidone (NMP) solution, and then the dispersion can be applied to or coated on a glass plate using known draw bar coating methods. The resulting film or films can be dried at high temperatures, such as from about 100° C. to about 400° C., from about 150° C. to about 300° C., and from about 175° C. to about 200° C. for a sufficient period of time, such as for example, from about 20 minutes to about 180 minutes, or from about 75 minutes to about 100 minutes while remaining on the glass plate. After drying and cooling to room temperature, the film or films on the glass plate or separate glass plates are immersed into water overnight, about 18 to 23 hours, and subsequently, the 50 to 150 microns thick film of films formed are released from the glass resulting in the functional intermediate transfer member or members as disclosed herein.

In embodiments, the polyaniline dialkylsulfate complex can be dispersed in a bisphenol-A-polycarbonate/methylene chloride ($CH_2Cl_2$) solution, and then the dispersion can be applied to or coated on a biaxially oriented poly(ethylene naphthalate) (PEN) substrate (KALEDEX™ 2000) having a thickness of 3.5 mils using known draw bar coating methods. The resulting film or films can be dried at high temperatures, such as from about 100° C. to about 200° C., or from about 120° C. to about 160° C. for a sufficient period of time, such as for example, from about 1 minute to about 30 minutes, or from about 5 minutes to about 15 minutes while remaining on the PEN substrate. After drying and cooling to room temperature, about 23° C. to about 25° C., the film or films on the PEN substrate or separate PEN substrates are automatically released from the substrate resulting in the functional intermediate transfer member or members as disclosed herein.

The disclosed intermediate transfer members are, in embodiments, weldable, that is the seam of the member like a belt, is weldable, and more specifically, may be ultrasonically welded to produce a seam. The surface resistivity of the disclosed intermediate transfer member is, for example, from about $10^9$ to about $10^{13}$, or from about $10^{10}$ to about $10^{12}$ ohm/sq. The sheet resistivity of the intermediate transfer weldable member is, for example, from about $10^9$ to about $10^{13}$, or from about $10^{10}$ to about $10^{12}$ ohm/sq.

The intermediate transfer members, illustrated herein, like intermediate transfer belts can be selected for a number of printing, and copying systems, inclusive of xerographic printing. For example, the disclosed intermediate transfer members can be incorporated into a multi-imaging system where each image being transferred is formed on the imaging or photoconductive drum at an image forming station, wherein each of these images is then developed at a developing station, and transferred to the intermediate transfer member. The images may be formed on the photoconductor and developed sequentially, and then transferred to the intermediate transfer member. In an alternative method, each image may be formed on the photoconductor or photoreceptor drum, developed, and transferred in registration to the intermediate transfer member. In an embodiment, the multi-image system is a color copying system, wherein each color of an image being copied is formed on the photoreceptor drum, developed, and transferred to the intermediate transfer member.

After the toner latent image has been transferred from the photoreceptor drum to the intermediate transfer member, the intermediate transfer member may be contacted under heat and pressure with an image receiving substrate such as paper. The toner image on the intermediate transfer member is then transferred and fixed, in image configuration, to the substrate such as paper.

The intermediate transfer member present in the imaging systems illustrated herein, and other known imaging and printing systems, may be in the configuration of a sheet, a web, a belt, including an endless belt, and an endless seamed flexible belt; a roller, a film, a foil, a strip, a coil, a cylinder, a drum, an endless strip, and a circular disc. The intermediate transfer member can be comprised of a single layer, or it can be comprised of several layers, such as from about 2 to about 5 layers. In embodiment, the intermediate transfer member further includes an outer release layer.

Outer release layer coatings include, for example, low surface energy materials with, for example, a contact angle of from about 85° (degrees) to about 150°, or from about 95° to about 125°. Examples of outer release layer materials are TEFLON®-like materials including fluorinated ethylene propylene copolymer (FEP), polytetrafluoroethylene (PTFE), polyfluoroalkoxy polytetrafluoroethylene (PFA TEFLON@) and other TEFLON®-like materials; silicone materials such as fluorosilicones and silicone rubbers such as Silicone Rubber 552, available from Sampson Coatings, Richmond, Va., (polydimethyl siloxane/dibutyl tin diacetate, 0.45 gram DBTDA per 100 grams polydimethyl siloxane rubber mixture with molecular weight of approximately 3,500); and fluoroelastomers such as those sold under the trade name VITON® such as copolymers and terpolymers of vinylidenefluoride, hexafluoropropylene, and tetrafluoroethylene, which are known commercially under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc. Two preferred known fluoroelastomers are (1) a class of copolymers of vinylidenefluoride, hexafluoropropylene, and tetrafluoroethylene, known commercially as VITON A®, (2) a class of terpolymers of vinylidenefluoride, hexafluoropropylene, and tetrafluoroethylene known commercially as VITON B®, and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can be those available from DuPont such as 4-bromoperfluorobutene-1,1, 1-dihydro-4-bromoperfluorobutene-1,3-bromoperfluoropropene-1,1,1-dihydro-3-bromoperfluoropropene-1, or any other suitable known, commercially available cure site monomer.

The circumference of the intermediate transfer member, especially as it is applicable to a film or a belt configuration, is, for example, from about 250 to about 2,500 millimeters, from about 1,500 to about 2,500 millimeters, or from about 2,000 to about 2,200 millimeters with a corresponding width of, for example, from about 100 to about 1,000 millimeters, from about 200 to about 500 millimeters, or from about 300 to about 400 millimeters.

Specific embodiments will now be described in detail. These examples are intended to be illustrative, and the disclosure is not limited to the materials, conditions, or process parameters set forth in these embodiments. All parts are percentages by weight of total solids unless otherwise indicated.

EXAMPLE I

Preparation of the Polyaniline Dimethylsulfate Complex:

The polyaniline dimethylsulfate complex was prepared as follows. Five grams of PANIPOL® F, an emeraldine salt (polyaniline) obtained from Panipol Oy (Porvoo Finland), was mixed for 16 hours with 0.5 gram of dimethylsulfate (Aldrich) and 30 grams of distilled water with dimethylsulfate being soluble in water, at about 40° C. to 60° C. The resulting mixture was then centrifuged, and the solid collected was re-slurried twice in water and then centrifuged again to remove any free dimethylsulfate. The final wet cake was dried under vacuum at 80° C. overnight, about 23 to about 25 hours, and there was obtained a polyaniline dimethylsulfate complex, which was confirmed by the presence of sulfur in the complex using the known XPS technique.

COMPARATIVE EXAMPLE 1

Preparation of Intermediate Polyaniline Transfer Member:

One gram of PANIPOL® F, an emeraldine salt obtained from Panipol Oy (Porvoo Finland), was mixed with nine grams of a bisphenol-A-polycarbonate, MAKROLON® 5705, and 100 grams of methylene chloride. By ball milling this mixture with 2 millimeter stainless shot overnight, or 23 hours, a uniform dispersion was obtained.

The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, the film on the PEN substrate was automatically released from the substrate resulting in a 50 micron thick intermediate transfer member of polyaniline/polycarbonate with a ratio by weight of 10/90.

EXAMPLE II

Preparation of Intermediate Transfer Member Comprised of a Polyaniline Dimethylsulfate Complex:

One gram of the polyaniline dimethylsulfate complex of Example I was mixed with nine grams of a bisphenol-A-polycarbonate, MAKROLON® 5705, and 100 grams of methylene chloride. By ball milling this mixture with 2 millimeter stainless shot overnight, or 23 hours, a uniform dispersion was obtained.

The dispersion was then coated on a biaxially oriented poly(ethylene naphthalate) (PEN) substrate (KALEDEX™ 2000) having a thickness of 3.5 mils using known draw bar coating methods. The resulting film was dried at about 120° C. for 1 minute while remaining on the PEN substrate. After drying and cooling to room temperature, about 25° C., the film on the PEN substrate was automatically released from the substrate, resulting in a 50 micron thick intermediate transfer member of polyaniline dimethylsulfate complex/polycarbonate with a weight percent ratio of 10/90.

SURFACE RESISTIVITY MEASUREMENT

The above ITB members or devices of Comparative Example 1 and Example II were measured after one day for surface resistivity (averaging four to six measurements at varying spots, 72° F./65 percent room humidity) using a High Resistivity Meter (Hiresta-Up MCP-HT450 from Mitsubishi Chemical Corp.). Then the ITB devices were acclimated in J zone (75° F./10 percent humidity) for an aging study, and the surface resistivity was measured again at 2 months and 3 months. The results are provided in Table 1.

TABLE 1

| | Surface Resistivity After 1 Day (ohm/sq) | Surface Resistivity After 2 Months (ohm/sq) | Surface Resistivity After 3 Months (ohm/sq) |
|---|---|---|---|
| Comparative Example 1 | $(4.76 \pm 0.10) \times 10^{9.67}$ | $(7.09 \pm 0.05) \times 10^{10}$ | $(9.89 \pm 0.25) \times 10^{10.99}$ |
| Example II | $(8.95 \pm 0.08) \times 10^{9.95}$ | $(1.25 \pm 0.12) \times 10^{10}$ | $(1.40 \pm 0.19) \times 10^{10.15}$ |

For the Comparative Example 1 ITB device comprising a polyaniline, after 3 months in J zone, the resistivity increased from about $10^{9.67}$ ohm/sq ($=4.76 \times 10^9$ ohm/sq) to about $10^{10.99}$ ohm/sq ($=9.89 \times 10^{10}$ ohm/sq), or about 1.32 ($=10.99$ to 9.67) orders of magnitude increase in resistivity. In contrast, for the Example II ITB device comprising a polyaniline dimethylsulfate complex, after 3 months in J zone, the resistivity only increased from about $10^{9.95}$ ohm/sq ($=8.95 \times 10^9$ ohm/sq) to about $10^{10.15}$ ohm/sq ($=1.40 \times 10^{10}$ ohm/sq), or about 0.20 ($=10.15$ to 9.95) order of magnitude increase in resistivity. It is generally accepted that the variation of the surface resistivity of an ITB device in any environments should be less than one order of magnitude for consistent toner transfer, thus print quality. The disclosed ITB device comprising a polyaniline dimethylsulfate complex (Example II) possessed an excellent maintained resistivity when compared with that comprising a polyaniline (Comparative Example 1).

The above calculations, such as $8.95 \times 10^9$ ohm/sq were accomplished to obtain the resistivity difference in orders of magnitude, instead of in percentages.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

What is claimed is:

1. An intermediate transfer member consisting of a polyaniline dialkylsulfate complex wherein the weight ratio of said polyaniline to said dialkylsulfate is from about 30/70 to about 99/1, and wherein said complex is represented by

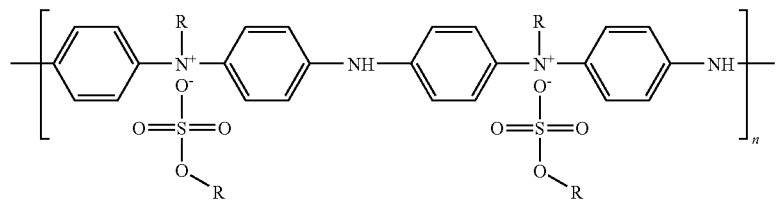

wherein n is the degree of polymerization of from about 50 to about 100, and R is alkyl containing from 1 to about 18 carbon atoms, an optional conductive component, an optional polymer, an optional release layer, and wherein said polyaniline is a hydrochloride acid doped emeraldine base.

2. An intermediate transfer member in accordance with claim 1 wherein said alkyl of said polyaniline dialkylsulfate complex contains from 1 to 7 carbon atoms.

3. An intermediate transfer member in accordance with claim 1 wherein said conductive component is a polyaniline, a carbon black, or a metal oxide.

4. An intermediate transfer member in accordance with claim 1 wherein said complex is dispersed in said polymer.

5. An intermediate transfer member in accordance with claim 4 wherein said polymer is a polyimide, a polycarbonate, a polyamidimide, a polyphenylene sulfide, a polyamide, a polysulfone, a polyetherimide, a polyester, a polyvinylidene fluoride, a polyethylene-co-polytetrafluoroethylene, or mixtures thereof.

6. An intermediate transfer member in accordance with claim 4 wherein said polymer is a polycarbonate, and said complex is a polyaniline dimethylsulfate complex.

7. An intermediate transfer member in accordance with claim 1 wherein said outer release layer is positioned on said complex and which complex is in the form of a layer.

8. An intermediate transfer member in accordance with claim 7 wherein said release layer consists of a fluorinated ethylene propylene copolymer, a polytetrafluoroethylene, a polyfluoroaikoxy polytetrafluoroethylene, a fluorosilicone, a polymer of vinylidenefluoride, hexafluoropropylene and tetrafluoroethylene, or mixtures thereof.

9. An intermediate transfer member in accordance with claim 1 wherein said polyaniline has a particle size diameter of 5 microns.

10. An intermediate transfer member in accordance with claim 1 wherein said complex is dispersed in said polymer of a polycarbonate.

11. An intermediate transfer member in accordance with claim 1 wherein the weight ratio of said polyaniline to said dialkylsulfate in said complex is from about 60/40 to about 90/10.

12. An intermediate transfer member in accordance with claim 1 wherein said polyaniline dialkylsulfate complex is present in an amount of from about 1 to about 30 percent by weight based on the weight of total solids.

13. An intermediate transfer member in accordance with claim 1 wherein said member has a surface resistivity of from about $10^7$ to about $10^{13}$ ohm/sq.

14. An intermediate transfer member in accordance with claim 1 wherein said surface resistivity is from about $10^9$ to about $10^{12}$ ohm/sq and wherein said polyaniline has a diameter of 5 microns.

15. An intermediate transfer member in accordance with claim 1 wherein said complex is selected from the group consisting of a polyaniline dimethylsulfate complex; a polyaniline diethylsulfate complex; a polyaniline dipropyisulfate complex; a polyaniline dibutylsulfate complex; a polyaniline dipentylsulfate complex; a polyaniline dihexylsulfate complex; a polyaniline diheptylsulfate complex; and mixtures thereof.

16. An intermediate transfer belt consisting of a supporting substrate and in contact with said substrate a layer consisting of a polyaniline dialkylsulfate complex dispersed in a polymer, wherein said complex is represented by

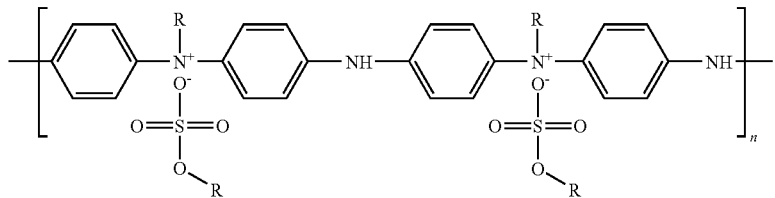

wherein n is the degree of polymerization of from about 50 to about 100, and R is alkyl containing from 1 to about 25 carbon atoms, wherein said polyaniline has a particle size of from about 0.5 to about 5 microns, and a conductive component, and wherein said polyaniline is a hydrochloride acid doped emeraldine base or wherein said polyaniline is a sulfuric acid doped emeraldine base.

17. An intermediate transfer belt in accordance with claim 16 wherein said substrate contains at least one seam and wherein said polyaniline has a particle size of 5 microns.

18. An intermediate transfer member in accordance with claim 16 wherein said alkyl contains from 1 to about 12 carbon atoms, and said polyaniline is a hydrochloride acid doped emeraldine base.

19. An intermediate transfer member in accordance with claim 16 wherein said alkyl contains from 1 to about 6 carbon atoms, and said polyaniline is a sulfuric acid doped emeraldine base.

20. An intermediate transfer member in accordance with claim 16 wherein said supporting substrate consists of a polymer selected from the group consisting of a polyimide, a polycarbonate, a polyamidimide, a polyphenylene sulfide, a polyamide, a polysulfone, a polyetherimide, a polyester, a polyvinylidene fluoride, a polyethylene-co-polytetrafluoroethylene, and mixtures thereof, present in an amount of from about 70 to about 97 weight percent.

21. An intermediate transfer member in accordance with claim 16 wherein the weight ratio of said polyaniline to said dialkylsulfate is from about 30/70 to about 99/1.

22. An intermediate transfer member consisting of a polyaniline dialkylsulfate complex selected from the group consisting of polyaniline dimethylsulfate, polyaniline diethylsulfate, polyaniline dipropylsulfate, polyaniline dibutylsulfate, polyaniline dipentylsulfate, polyaniline dihexylsulfate, and polyaniline diheptylsulfate, wherein the weight ratio of said polyaniline to said dialkylsulfate is from about 60/40 to about 90/10, wherein said complex is dispersed in a polymeric binder and wherein said polyaniline is a hydrochloride acid doped emeraldine base or wherein said polyaniline is a sulfuric acid doped emeraldine base.

23. An intermediate transfer member in accordance with claim 22 wherein said complex is selected from the group consisting of a polyaniline dimethylsulfate; and a polyaniline diethylsulfate, and wherein said polyaniline is of diameter of from about 0.5 to about 5 microns.

24. An intermediate transfer member in accordance with claim 22 wherein said polyanilne is of a diameter of 0.5 microns, or 5 microns.

* * * * *